United States Patent [19]
Cherry et al.

[11] Patent Number: 5,563,810
[45] Date of Patent: Oct. 8, 1996

[54] DEVICE AND METHOD FOR PERFORMING ACOUSTIC SCAN CONVERSION

[75] Inventors: John W. Cherry, Bonny Doon; David J. Finger, San Jose; Mehebub Karmali, Fremont; Donald R. Langdon, Mountain View, all of Calif.

[73] Assignee: Acuson Corporation, Mountain View, Calif.

[21] Appl. No.: 433,620

[22] Filed: May 3, 1995

[51] Int. Cl.⁶ .................................................. G01C 25/00
[52] U.S. Cl. .................... 364/571.04; 348/163; 348/442; 128/660.01; 367/7
[58] Field of Search ........... 364/571.04, 571.01–571.03, 364/571.07, 577, 550; 348/163, 442; 342/185; 128/660.01–663.01; 73/626, 625, 624, 620, 628–632; 367/7–11

[56] References Cited

U.S. PATENT DOCUMENTS

| | | | |
|---|---|---|---|
| 4,214,269 | 7/1980 | Parker et al. ............................ | 358/140 |
| 4,245,250 | 1/1981 | Tiemann . | |
| 4,310,907 | 1/1982 | Tachita et al. . | |
| 4,398,540 | 8/1983 | Takemura et al. . | |
| 4,468,747 | 8/1984 | Leavitt et al. . | |
| 4,471,449 | 9/1984 | Leavitt et al. . | |
| 4,780,712 | 10/1988 | Itaya et al. .............................. | 340/747 |
| 4,844,083 | 7/1989 | Kanda et al. . | |
| 5,197,037 | 3/1993 | Leavitt ..................................... | 367/11 |

OTHER PUBLICATIONS

E.E. Swartzlander, Jr. et al., "How to transform, interpolate, and improve your image," TRW Space & Defense Section, *Quest* (Winter 1987).
S.C. Leavitt et al., "A Scan Conversion Algorithm for Displaying Ultrasound Images," Hewlett–Packard Journal, pp. 30–34 (Oct. 1983).
H.G. Larsen et al., "Comments on Robinson, D.E. and Knight, P.C. Interpolation scan conversion in pulse echo ultrasound, *Ultrasonic imaging* 4 297–310 (1982)," Hewlett–Packard Medical Products Groups (date unknown).
D.E. Robinson, "Digital Ultrasonic Image Reconstruction and Display" (date unknown).
D.E. Robinson et al., "Interpolation Scan Conversion in Pulse–Echo Ultrasound," Ultrasonic Imaging, vol. 4, No. 4, pp. 297–310 (Oct. 1982).
J.F. Havlice et al., "Medical Ultrasonic Imaging: An Overview of Principles and Instrumentation," Proceedings of the IEEE, vol. 67, No. 4, pp. 620–641 (Apr. 1979).
M.G. Maginness, "Methods and Terminology for Diagnostic Ultrasound Imaging Systems," Proceedings of the IEEE, vol. 67, No. 4, pp. 641–653 (Apr. 1979).
J. Ophir et al., "Digital Scan Converters in Diagnostic Ultrasound Imaging," Proceedings of the IEEE, vol. 67, No. 4, pp. 654–664 (Apr. 1979).
R.L. Deter et al., "A Survey of Abdominal Ultrasound Scanners: The Clinician's Point of View," Proceedings of the IEEE, vol. 67, No. 4, pp. 664–671 (Apr. 1979).
A. Rivière et al., "A Digital Compound Scan System Under Microprocessor Control," Thomson–CSF, ASM Division in 1978 Ultrasonics Symposium Proceedings.

*Primary Examiner*—James P. Trammell
*Attorney, Agent, or Firm*—Brinks Hofer Gilson & Lione

[57] ABSTRACT

An ultrasound acoustic scan conversion device includes an accumulator, an error correction logic unit, and a walk controller. The error correction logic unit is responsive to the accumulator and contains an error correction circuit. The walk controller is responsive to the accumulator and generates a display memory address and selects increment values for the accumulator. A method of performing scan conversion in an ultrasound system is also provided. The method includes the steps of loading at least one register within an accumulator, producing an acoustic coordinate responsive to the accumulator, producing a natural grid acoustic range value, offsetting the acoustic coordinate to produce a natural grid acoustic range value, addressing the acoustic data memory with an acoustic data memory address responsive to the natural grid range value, generating a display memory address corresponding to the acoustic data memory address, and addressing the display memory with the generated display memory address.

36 Claims, 9 Drawing Sheets

Microfiche Appendix Included
(1 Microfiche, 14 Pages)

DEVICE AND METHOD FOR PERFORMING ACOUSTIC SCAN CONVERSION

REFERENCE TO MICROFICHE APPENDIX

This application includes a microfiche appendix of one sheet having 14 frames. A portion of the disclosure of this patent document contains material which is subject to copyright protection. The copyright owner has no objection to the facsimile reproduction by anyone of the patent document of the patent disclosure, as it appears in the Patent and Trademark Office patent files or records, but otherwise reserves all copyright rights whatsoever.

BACKGROUND OF THE INVENTION

Scan conversion systems for ultrasound imaging systems typically receive acoustic data comprising a set of acoustic scan lines which sample a two dimensional object field. The acoustic data is resampled from the acoustic grid to a display grid generating a display data set placed into a display memory for output on a rectangular display device. An example of a conventional scan conversion system is described in U.S. Pat. No. 4,471,449.

Although conventional scan conversion systems perform their desired function, certain limitations are inherent in these systems. For example, conventional scan conversion systems resample the acoustic data set, visiting each display data point in the display grid within a region bounded by adjacent scan lines and a boundary connecting the end points of the adjacent scan lines. Successive regions in the display grid bounded by adjacent scan lines are reconstructed one at a time which can result in significant inefficiencies due to the number of display data points visited outside of the region when detecting region boundaries. Thus, it would be desirable to reduce the inefficiency in the resampling process.

Another disadvantage of conventional systems is that approximations used in the resampling process may result in excessive errors in the resulting display values. Thus, it would also be desirable to provide an acoustic scan conversion system which reduces errors in the resampling process.

Another disadvantages of conventional systems is that the acoustic data on the acoustic grid is restricted to lie on a rectangular or polar grid where samples along the acoustic scan lines are equally spaced from a common apex. In applications using other grids, such as vector array, it would be desirable to perform resampling of acoustic data where samples along the acoustic scan lines do not have to be equally spaced from a common apex.

Accordingly, there is a need for an improved scan conversion system and method providing greater efficiency, reduced error, and support for a variety of acoustic grids.

SUMMARY OF THE INVENTION

The present invention relates generally to ultrasound processing systems, and more particularly to an improved system and method for performing ultrasound acoustic scan conversion.

According to one aspect of the invention, an ultrasound acoustic scan conversion device includes an accumulator, an error correction logic unit, and a walk controller. Preferably, an acoustic data memory address that comprises a range component and an arc length component is provided and is responsive to the accumulator. The error correction logic unit is responsive to the accumulator and contains an error correction circuit. The error correction circuit preferably receives the range component and produces an error corrected range component. The walk controller is responsive to the accumulator and generates a display memory address and selects increment values for the accumulator.

According to a further aspect of the invention, the ultrasound acoustic scan conversion device includes an accumulator, a superslice logic unit responsive to the accumulator, a display memory address generator, and a walk controller. The superslice logic unit produces a superslice polar angle address. The walk controller is coupled to the accumulator and to the display memory address generator unit. The walk controller selects counter controls for the display memory address generator, selects increment values for the accumulator, and cooperates with the superslice logic unit to walk along at least a portion of the display locations within a superslice.

A further aspect of the invention provides an ultrasound acoustic scan conversion device including an accumulator, a natural grid logic unit, and a walk controller. The natural grid logic unit is responsive to the accumulator and produces a natural grid range value. The walk controller selects increment values for the accumulator and generates a display memory address.

A further aspect of the invention relates to a method of performing scan conversion in an ultrasound system. The method includes the steps of loading at least one register in communication with an accumulator, producing an acoustic coordinate responsive to the accumulator, performing error correction on the acoustic coordinate to generate an error corrected acoustic coordinate, addressing the acoustic data memory with an acoustic data memory address responsive to the error corrected acoustic coordinate, generating a display memory address corresponding to the acoustic data memory address, and addressing the display memory with the generated display memory address.

A further aspect of the invention provides a method of performing scan conversion in an ultrasound system. The method includes the steps of loading at least one register within an accumulator, producing an acoustic coordinate responsive to the accumulator, producing a natural grid acoustic range value, offsetting the acoustic coordinate to produce a natural grid acoustic range value, addressing the acoustic data memory with an acoustic data memory address responsive to the natural grid range value, generating a display memory address corresponding to the acoustic data memory address, and addressing the display memory with the generated display memory address.

The invention itself, together with its attendant advantages, will best be understood by reference to the following detailed description, taken in conjunction with the accompanying drawings.

DETAILED DESCRIPTION OF THE PREFERRED EMBODIMENTS

Before describing the drawings it should be noted that the term "accumulator" as used herein refers to an adding function, a holding register, and any other logic circuitry needed to produce an accumulated result. The term "arc legnth component" as used herein refers to any function of arc length.

Figure 1:
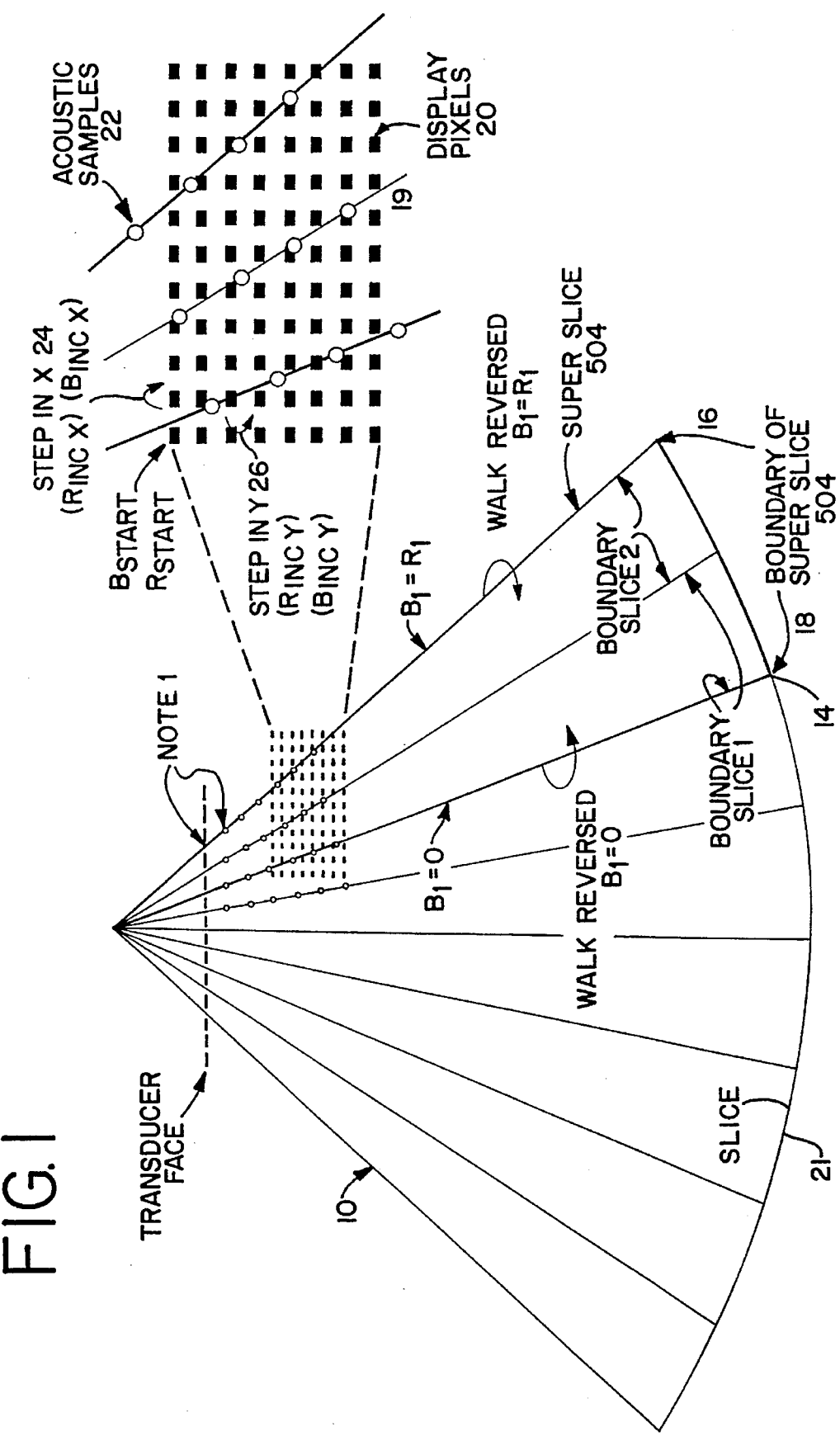
FIG. 1 is a diagram illustrating an ultrasound vector scan format including a plurality of ultrasound slices and a rectangular display grid.

Turning now to FIG. 1, there is an illustration of a vector format 10 to be walked by a preferred embodiment of the present invention. A scan conversion process for the vector format 10 involves a walk starting point 14 on a display grid for which β start and R start values 14 are computed, boundaries of superslice 16, 18, and a plurality of slices 21. Each slice 21 is bounded by ultrasonic lines 19. Each ultrasonic line 19 includes a plurality of data points referred to as acoustic samples 22. The acoustic samples 22 are equally spaced along each ultrasonic line 19 starting at the face of the transducer. At the right-most superslice boundary 16 a beta value $β_I$ is equal to a range value $R_I$. At the left-most boundary 18 the beta value $β_I$ is equal to zero.

Also shown is a plurality of display pixels 20 arranged in a rectangular configuration. Values for each of the display pixels 20 are generated as the walk proceeds from the start position of the superslice 504, preferably across and down the superslice 504 to a skirt boundary at the bottom of the superslice 504. During the walk, the scan conversion process steps in X as shown at 24 to move across the superslice 504 and also steps in Y as shown at 26 to move down the superslice 504. In this manner a value for each of the display pixels 20 may be interpolated from acoustic samples 22 surrounding or in a neighborhood of the display pixel 20 being generated.

Figure 2:
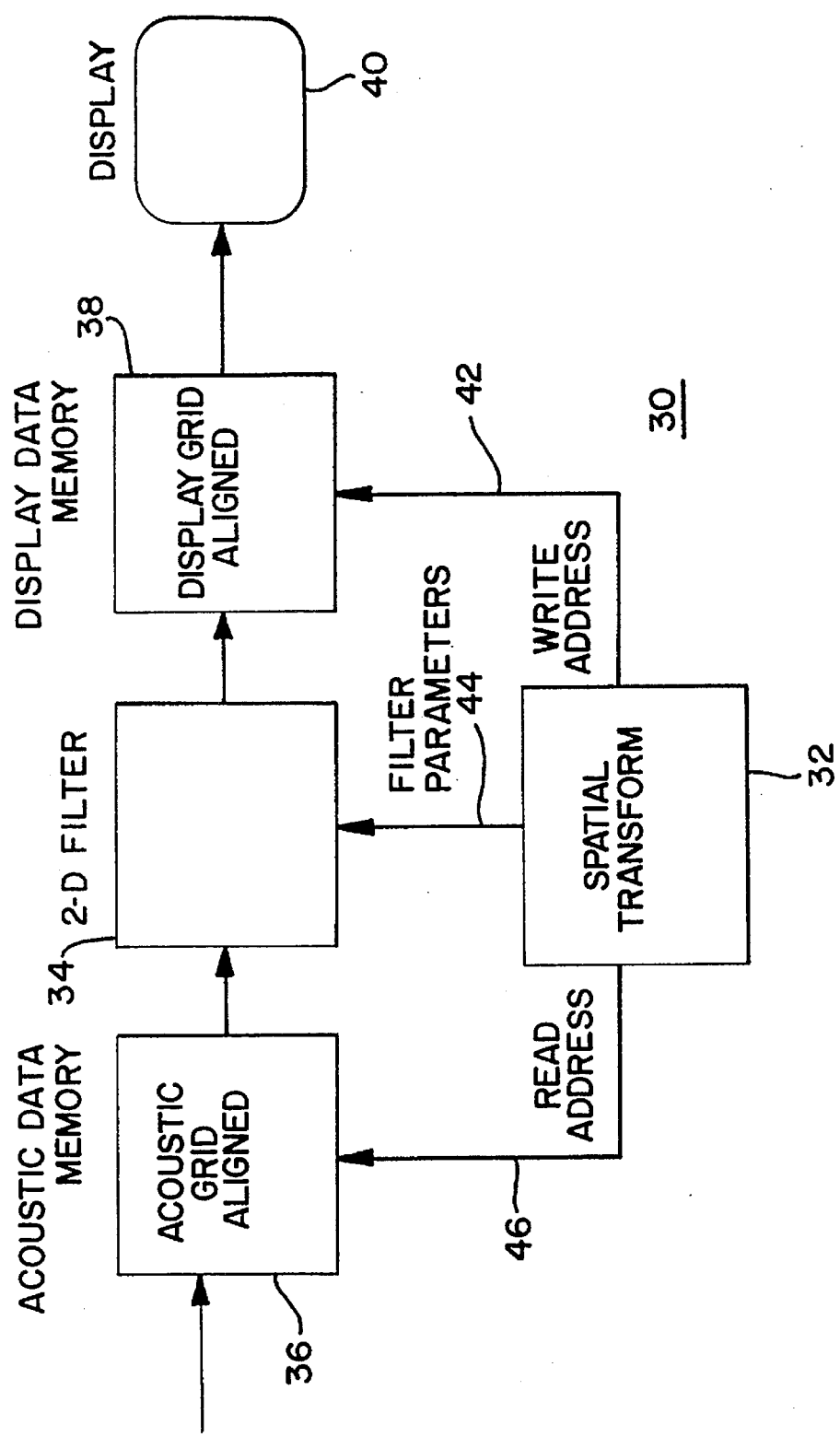
FIG. 2 is a block diagram of an ultrasound imaging scan conversion system.

FIG. 2 shows an ultrasound scan conversion system 30 that may be used to walk down a slice 21 or multiple slices comprising a superslice 504 of the vector 10 described in FIG. 1. The scan conversion system 30 includes an acoustic data memory 36, a two-dimensional filter 34, a display data memory 38, a spatial transform engine 32 (STE), and a display device 40. The STE 32 is connected to the acoustic data memory 36 by an address bus 46, to the two-dimensional filter by a filter parameter bus 44, and to the display data memory 38 by a write address bus 42. The STE 32 is preferably implemented in an integrated circuit using 0.5 micron CMOS technology, such as integrated circuits including Epson SLA20000, Fujitsu CG51, Hitachi HG72, IBM CMOS 5L, Motorola H4C195, and NEC CMOS-8L gate array integrated circuits. Although the STE 32 may also be implemented in 0.8 micron CMOS technology, the 0.5 micron CMOS technology is presently preferred over the 0.8 micron implementation due to substrate space, speed, and cost considerations. In addition, the STE 32 may also be implemented in standard cell integrated circuits including Fujitsu CS50, IBM CMOS 5L, and LSI LCB500K standard cell integrated circuits. Alternatively, the STE 32 may be constructed using multiple programmable logic circuits, such as AT&T ORCA 2C40 integrated circuits, or may be built from discrete circuit components.

The two-dimensional filter 34 is a conventional finite impulse response filter. One example of a suitable two-dimensional filter is a Logic Devices 11×10 bit LF2246 image filter. As those skilled in the art will appreciate, other such filters may also be used. Regardless, the filter is not a part of the present invention.

The acoustic data memory 36 and the image memory 38 are conventional RAM memory devices well known to those of ordinary skill in the art. The display device 40 is typically a CRT or LCD display having a 640×480 size rectangular screen. The display device used is not part of the present invention. The filter parameter bus 44 between the spatial transform engine 32 and the two dimensional filter 34 carries filter parameters including a fractional range value $R_{If}$ 501 and a fractional epsilon value $E_{Lf}$ 287. The read address bus 46 connecting the STE 32 and the acoustic data memory 36 preferably carries 3 bits from epsilon value $E_{Li}$ 104 and 14 bits from range value $R_{Ii}$ 502. The write address bus 42 connecting the STE 32 with the display data memory 38 preferably carries 11 bits of X address information and 11 bits of Y address information.

Figure 3:
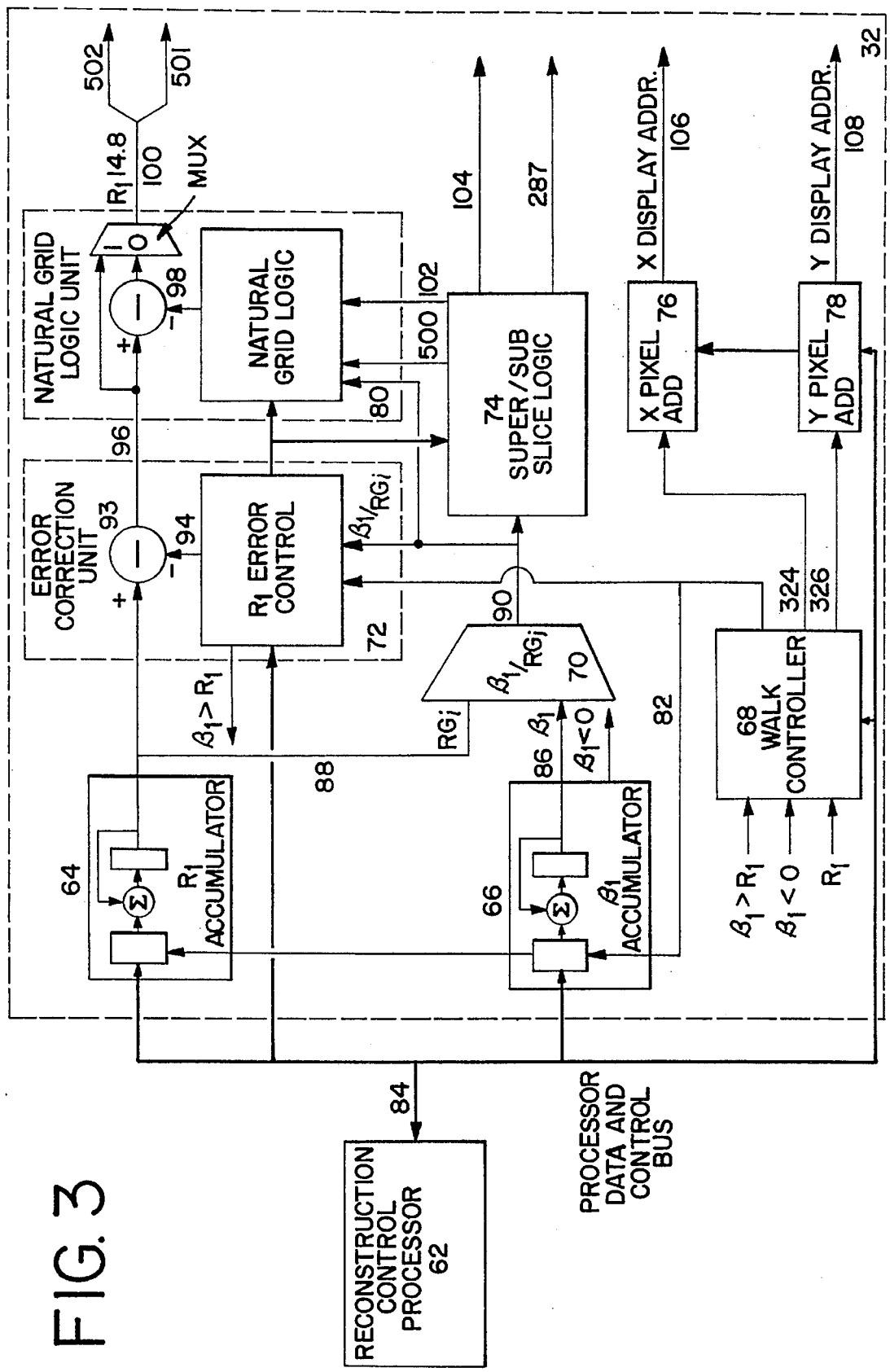
FIG. 3 is a block diagram of a preferred embodiment of the spatial transform system of FIG. 2.

FIG. 3 illustrates a preferred embodiment of the STE 32 of FIG. 2, and a reconstruction control processor 62. The STE 32 includes accumulators 64 and 66, a divider 70, a walk controller 68, an error control block 72, a natural grid logic unit 80, a super/sub slice logic unit 74, and X and Y pixel address generation units 76, 78.

The reconstruction control processor 62 is preferably a digital signal processor such as a TMS 320C31 processor from Texas Instruments running at 40 Mhz. The control processor 62 operates in two phases in cooperation with the rest of the STE 32. In the first phase, a register loading phase, the reconstruction control processor 62 loads data into registers within many of the other components of the STE 32. To initiate the second phase (execution phase), the control processor 62 sends a signal to the STE 32 to execute the scan conversion process. These two phases, the register loading and the execution phase, are then repeated for each superslice 504 of the vector 10 and thereby produces values for each pixel 20 in the display data memory 38. The processor 62 is programmable in the C programming language and a representative source code listing is attached in a microfiche appendix. The processor 62 communicates with each of the STE registers over a data and control bus 84.

The first accumulator 64 produces a range value $RG_i$ and is referred to as the range accumulator 64. The range accumulator 64 includes at least one and preferably three input registers, a summer, and an output register. The second accumulator 66, known as the beta accumulator, produces a beta value $β_I$, which approximates the ratio of the arc length divided by the slice angle. The output of the range accumulator 64 and the beta accumulator 66 are fed into a divider unit 70. The divider unit 70 receives range value $RG_i$ 88 and beta value $β_I$ 86 and produces a division output defined by the ratio of $β_I/RG_i$ 90. The divider output value 90 is fed into the super/sub slice logic unit 74 and the $R_I$ error control block 72. The error control block 72 receives the divider output 90 and generates a range error correction value 94. The error correction value 94 is subtracted from the original range value 88 to produce an error corrected range value 96.

The walk controller 68 receives an input from the control processor 62 and also receives an indicator value at its input of whether $\beta_I$ is greater than $R_I$ or whether $\beta_I$ is less than zero. These two indicator values identify the ultrasonic line boundaries of the superslice 504 that is currently being walked. Specifically when $\beta_I$ is less than zero the system has walked past the left boundary 18 of the superslice 504. When $\beta_I$ is greater than $R_I$, then the system has walked past the right boundary 16 of the superslice 504. Thus, the walk controller 68 determines when the STE 32 has walked past either of the two boundaries 16, 18 of the superslice 504.

The walk controller 68 also produces a walk control signal 82 that is fed into the beta accumulator 66, the range accumulator 64, and the $R_I-\beta_I$ accumulator 304. The walk control signal 82 has a direction component that instructs the accumulators the direction of the walk. For example, as long as the display pixel 20 is within the superslice boundaries 16, 18, the walk controller 68 may first instruct both accumulators to walk in an X direction. However, once a boundary 16, 18 has been crossed, the walk controller 68 instructs the accumulators to change direction, typically to walk down in a Y direction one step and then to walk in the opposite X direction to continue walking within the slice boundaries 16, 18.

The walk controller 68 also produces counter control signals 324, 326 which are fed into X pixel address block 76 and Y pixel address block 78. The counter control signals 324, 326 have a direction component and an enable/disable component. The X pixel address unit 76 and the Y pixel address unit 78 each have a counter for generating a respective X display address 106 and Y display address 108 for addressing display data memory 38.

The super/sub slice logic unit 74 receives the output from the divider 70 and generates an integer epsilon value $E_{Li}$ 104 as well as a fractional epsilon value $E_{Lf}$ 287. The integer epsilon value 104 is directed to the acoustic data memory 36 and the fractional epsilon value 287 is directed to the two-dimensional filter 34. The natural grid logic unit 80 receives a unique fractional epsilon value $SSE_f$ 102 from the super/sub slice logic unit 74, and produces a natural grid range offset value 98. When the natural grid logic unit 80 is enabled, the natural grid offset value is subtracted from the error corrected range value 96. The output from the subtraction is the final STE range output value $R_f$ 100, also referred to as the natural grid range value, the integer portion 502, of which is fed to the acoustic data memory 36, and the fractional portion 501 of which is fed to the two-dimensional filter 34. Where the natural grid logic unit 80 is disabled, the output range value 100 is the error corrected range value 96.

Figure 4:
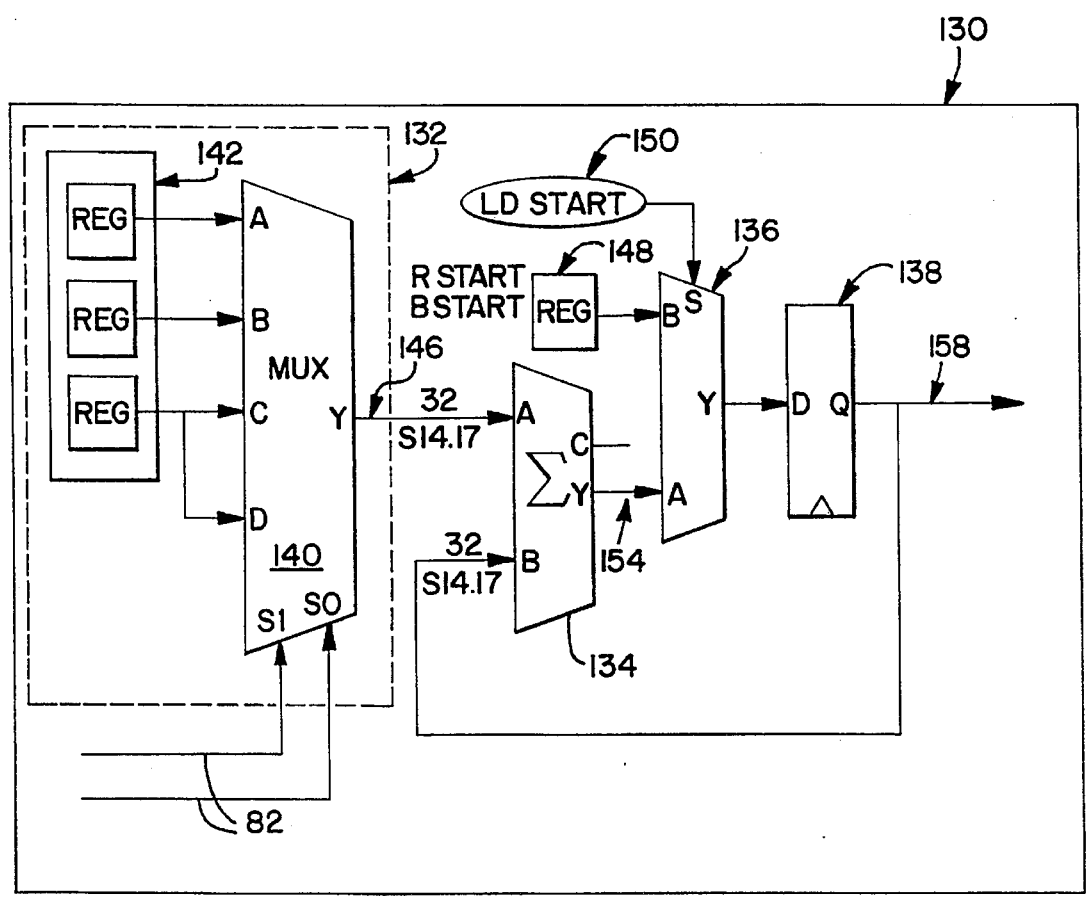
FIG. 4 is a block diagram of a preferred embodiment of one of the accumulators of FIG. 3.

FIG. 4 illustrates a preferred embodiment for an accumulator 130 such as the range accumulator 64, the beta accumulator 66, or the $R_I-\beta_I$ accumulator 304. The accumulator 130 includes a selector block 132, a summing unit 134, a second selector 136, and an output register 138. The selector block 132 includes increment/decrement registers 142 and a multiplexer (MUX) 140. The MUX 140 is controlled by control lines 82 from the walk controller 68. The increment/decrement registers 142 are typically 32 bit registers. The output from the increment/decrement registers 142 has a binary format of a single sign bit, 14 bits of integer, and 17 bits of fractional component. The fractional component is preferably divided into a resolution portion and a guard bit portion. As those skilled in the art will appreciate, a tradeoff exists between the number of guard bits available in the guard bit portion and the amount of desired resolution for a particular application. The output from the MUX 140 is a 32 bit increment/decrement value 146 which has the same format as the registers 142.

The second selector 136 has an input from the summing unit 134 and has a second input from a start register 148. The selector 136 is controlled by a load start control signal 150 generated in response to the reconstruction control processor 62 at the start of the execution phase. As a result, in response to an LD start control signal 150, the start register 148 is fed through the selector 136 into the output register 138. In turn, the output from register 138, labelled 158, is produced by the accumulator 130. The output 158 is also fed back into the summing unit 134.

Once the STE 32 has begun the scan conversion process, the LD start signal 150 is then turned off. At this time, the output from the summing unit 134 is then connected via the selector 136 to output register 138. The summing unit 134 then adds the output value 158 to the output of the selector block 132. Thus, a summer value 154, from the summer 134, is passed through the selector block 136 and through the output register 138 to appear at the output of the accumulator 130. As the STE 32 continues to walk along the superslice 504, the accumulator 130 continues to add an accumulation value, either an increment value or a decrement value, to the current output value 158. Although only one accumulator 130 is illustrated in FIG. 4, it should be noted that this accumulator 130 describes the hardware used for range accumulator 64, beta accumulator 66, and an $R_I-\beta_I$ accumulator 304. Also, the increment and/or decrement values loaded into the registers 142 for the accumulators are precalculated by the reconstruction control processor 62. The formulas used by the processor 62 to calculate each of these values are illustrated below in Table 1.

TABLE 1

Equations: $\phi_s = \phi_l - \phi_r$ $$R_{INCx} = \frac{SF}{\sin\phi_s} [AR(\cos\phi_R - \cos\phi_L)]$$

$$R_{INCY} = \frac{SF}{\sin\phi_s} [\sin\phi_L - \sin\phi_R]$$

$R_{DECX} = -R_{INCx}$ \qquad $R_{DECY} = -R_{INCY}$ $B_{INCx} = \dfrac{SF}{-\sin\phi_s} [AR(\cos\phi_L)]$ \qquad $B_{INCy} = \dfrac{SF}{-\sin\phi_s} [-\sin\phi_L]$ $B_{DECX} = -B_{INCx}$ \qquad $B_{DECX} = -B_{INCx}$ $$R_{START} = \frac{SF}{\sin\phi_s} [AR(\cos\phi_R - \cos\phi_L)N_X + (\sin\phi_R - \sin\phi_L)N_Y]$$

TABLE 1-continued $$B_{START} = \frac{SF}{-\text{Sin}\phi_s} [AR\text{Cos}\phi_L N_X - \text{Sin}\phi_l N_Y]$$
$$R - B_{START} = K(R_{START} - B_{START})$$
$$R - B_{INCX} = K(R_{INCX} - B_{INCX})$$
$$R - B_{DECX} = -(R - B_{INCX})$$
$$R - B_{INCY} = K(R_{INCY} - B_{INCY})$$
$$R - B_{DECY} = -(R - B_{INCY})$$
$$K = (8\text{Sin}^2(\phi_S/4))*2^P$$
GIVEN: $1/2 < K < 1$ $\phi L$ = The angle that the acoustic line at the left edge of the superslice 504 makes with the vertical axis of the display.
$\phi R$ The angle that the acoustic line at the left edge of the superslice 504 makes with the vertical axis of the display.

For the above equations, it should be noted that SF is the scale factor defined as the number of range samples on the acoustic grid per the number of TV lines on the display grid, and AR is the display pixel aspect ratio defined as the number of TV lines per pixel. Also, R represents range values and β represents beta values. These values are loaded from the processor 68 into the appropriate accumulator registers within the STE 32.

Figure 5:
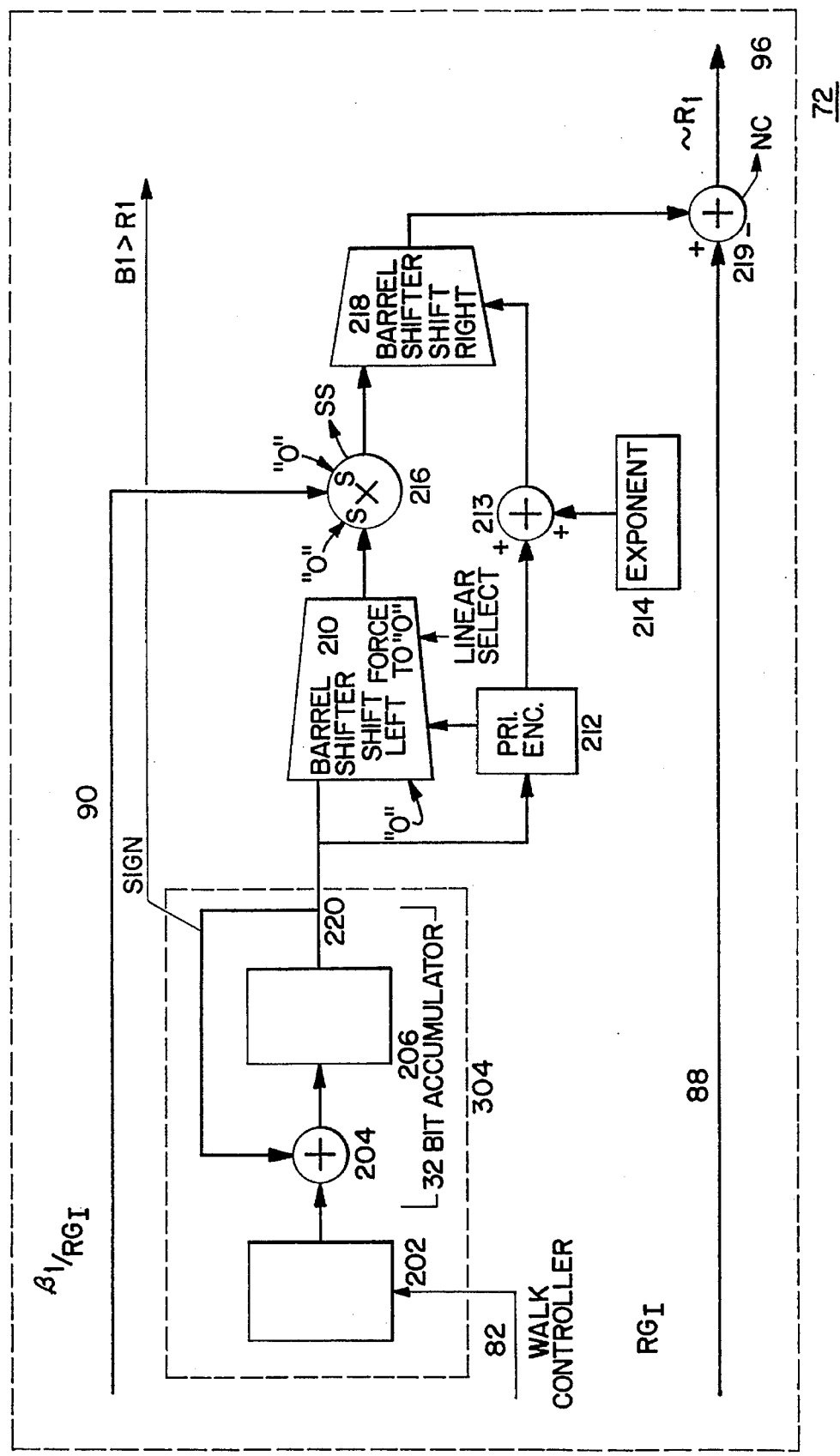
FIG. 5 is a block diagram of a preferred embodiment of the error correction logic unit of FIG. 3.

FIG. 5 shows a preferred range error correction circuit 72. The error correction circuit 72 includes a 32 bit accumulator and a floating point multiplier. The 32 bit accumulator includes an increment register 202, a summing device 204, and an output register 206. The floating point multiplier has an 11×11 bit mantissa with a 5 bit exponent input and has a 22 bit mantissa, 5 bit exponent output. The floating point multiplier includes a left barrel shifter 210, a priority encoder 212, an exponent register 214 and adder unit 213, a right barrel shifter 218, and a multiplier circuit 216. The inputs to the multiplier 216 include the $B_I/RG_I$ value 90 from the divider 70 and the output of the output register 206 after the output has been normalized by barrel shifter 210.

The output from the floating point multiplier is the range error correction value 94. The range error correction value 94 is preferably subtracted from the originally calculated range value $RG_I$ 88 using a 22 bit adder 219 to produce an error corrected range value 96. As those skilled in the art will appreciate, the value of K, in the preferred embodiment $$K = \left(8\text{Sin}^2\left(\frac{\Theta_s}{4}\right)\right) * 2\hat{P},$$

which may be calculated according to other error correction formulas than the presently preferred sin squared formula. Thus, the error correction circuit 72 provides an improvement in range value accuracy and thereby provides significant advantages over conventional acoustic scan conversion systems. Improved range value accuracy allows a superslice 504 to be comprised of a larger set of ultrasound slices 21, and cover a larger angular extent, which results in improved scan conversion processing efficiency.

Figure 6:
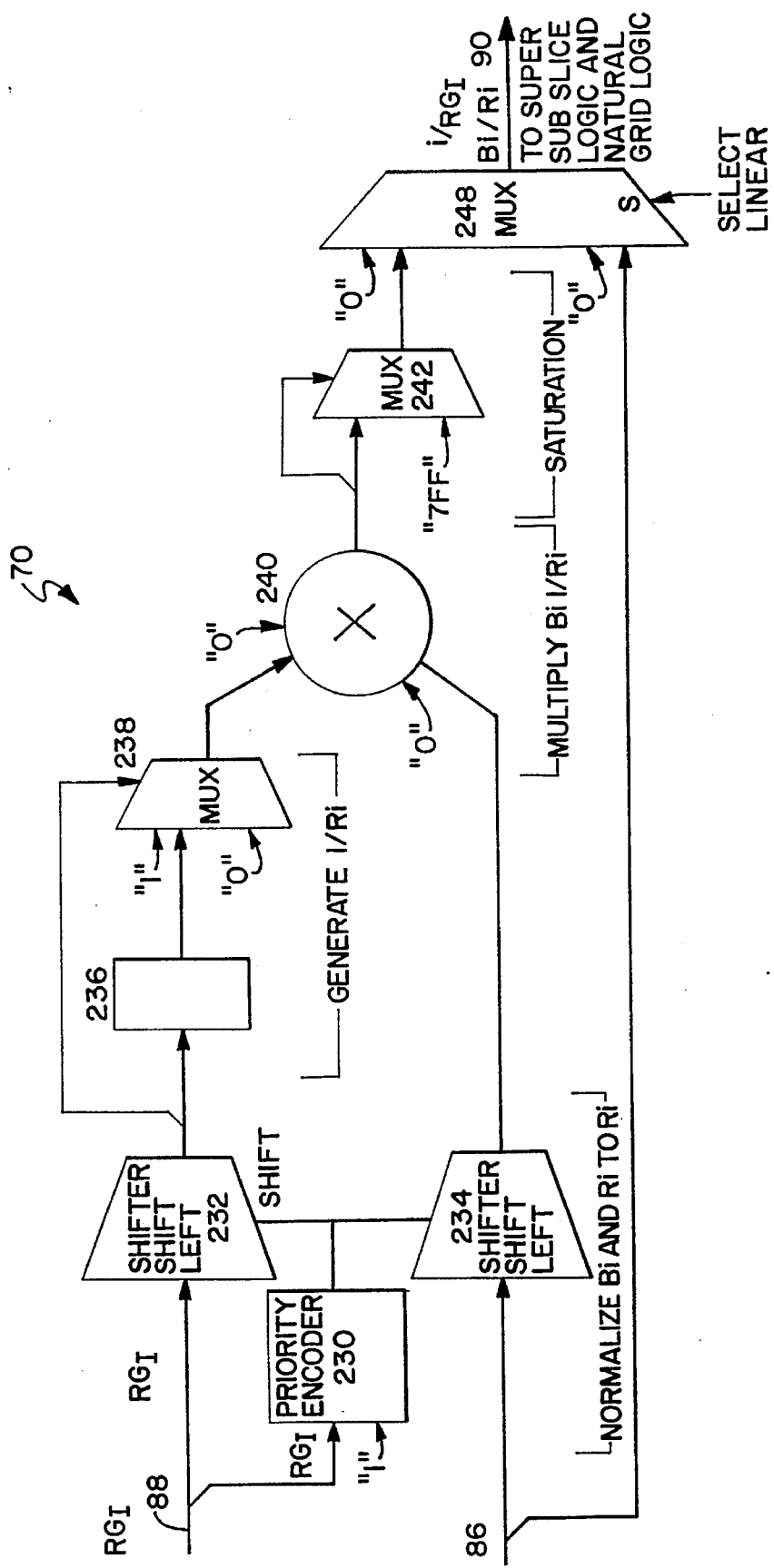
FIG. 6 is a block diagram of a preferred embodiment of the divider block of FIG. 3.

FIG. 6 illustrates a preferred embodiment for the divider 70. The divider 70 includes a normalizing stage, a reciprocal generation stage, and a multiplier stage 240. The normalization stage includes a priority encoder 230, a first left shifter 232 and a second left shifter 234. The reciprocal generation stage includes a read only memory 236 and a multiplexer 238. The multiplier 240 preferably multiplies two 12 bit signed values and generates a signed 24 bit output. Also in the preferred embodiment a saturation multiplexer 242 is provided to set undesired large values output from the multiplier 240 to a maximum value.

During operation of the divider 70, the input range value $RG_I$ 88 and beta value 86 are fed into the normalization stage. The normalized range value is then mapped into the reciprocal of the range value by the ROM look-up table 236. Thereafter, the reciprocal range value and the normalized beta value are multiplied by the multiplying circuit 240 providing a normalized arc length output $B_I/R_I$ 246. This normalized arc length output value 246 is checked for saturation by the saturation multiplexer 242, which feeds into an output multiplexer 244. The other input to the multiplexer 244 is coupled to the originally input beta value 86. The multiplexer 244 receives a selector control signal 248 which provides an optional bypass mode where the beta value 86 is fed straight through the multiplexer 244 to the divider output 90. The optional bypass mode is typically used for linear formats where a $B_I/R_I$ value is not needed. Otherwise, the multiplier output 246 through the saturation MUX 242 is provided at the divider output 90.

Figure 7:
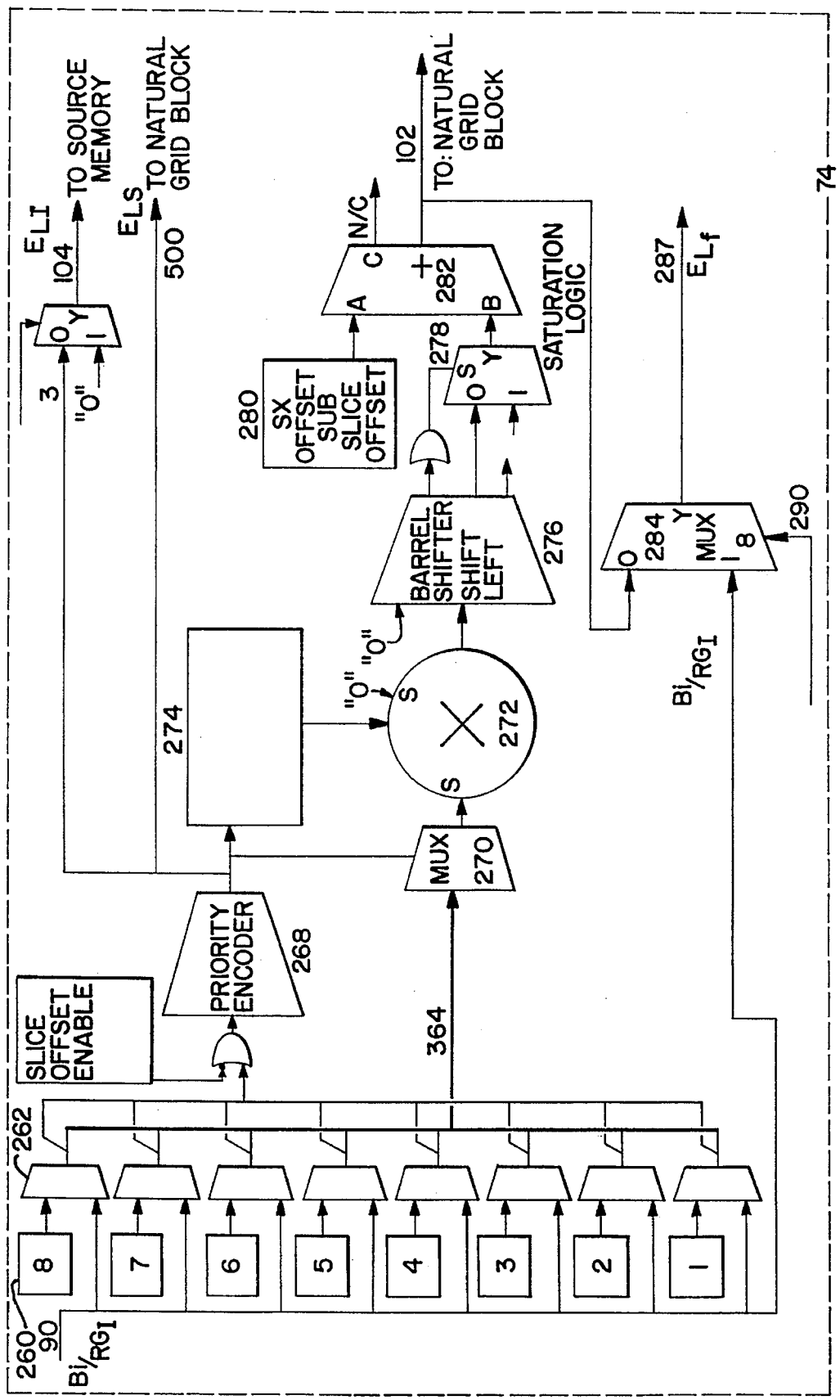
FIG. 7 is a block diagram of a preferred embodiment of the super/sub slice hardware unit of FIG. 3.

FIG. 7 illustrates a preferred embodiment of the super/sub slice hardware unit 74. This unit 74 receives the $\beta_I/RG_I$ value 90 from the divider unit 70 and produces either super slice or sub slice epsilon values $SSE_L$ 102, $E_{Lf}$ 287, $E_{LI}$ 104, or $E_{LS}$ 500 at its output. The super/sub slice hardware circuit 74 includes a plurality of offset registers 260 and a plurality of subtraction units 262. The circuit 74 also includes a register file 274, priority encoder 268, multiplier 272, multiplexer 270, barrel shifter 276, summing unit 282, and multiplexer 284.

The offset registers 260 each store an offset value calculated by the control processor 62 for each slice within a superslice 504. In the preferred embodiment, the offset values are calculated according to the following formula:

$$x\ln = \frac{\text{Sin}(\phi_I - \phi_L)}{\text{Sin}(\phi_I - \phi_L) + \text{Sin}(\phi_R - \phi_I)}.$$

Ref. to Table 1 for definitions of $\phi L$ and $\phi R$ $\phi 1$ = The angle that the acoustic line at the left edge of a slice inside a super slice makes with the vertical axis of the display The subtraction units 262 subtract the $B_I/RG_I$ value 90 from the offset value stored in each of the offset registers 260. The subtractors 262 thereby produce a set of offset difference values 264 and also produce a set of sign bits 266.

The set of sign bits 266 is fed into the priority encoder 268 which selects one of the registers in the register file 274. The priority encoder 268 determines which slice within the super slice is currently active by looking at the sign values from the subtractors 262. Depending on the active slice, the register file 274 outputs a corresponding scaling factor 275 that has been previously calculated by the control processor according to the following formula:

$$\text{scale factor} = \frac{1}{Xl_N - Xl_{N-1}}.$$

The scaling factor 275 from the register file 274 is a floating point number. The multiplier 272, barrel shifter 276, and multiplexer 270 cooperate to multiply the offset difference 264 by the scaling factor 275 to produce a super slice epsilon value $SSE_L$ 102.

A saturation logic unit 278 is provided to prevent errors at boundary conditions of the computed epsilon value $SSE_L$ 102. The super slice epsilon value 102 is fed into one input of the multiplexer 284. Also, the $\beta_I/RG_I$ value 90 is fed into another input of the multiplexer 284. The multiplexer 284 is controlled by a select line 290 generated by the control processor 62. The select line 290 controls whether the super slice epsilon value $SSE_L$ 102 or the input value 90 is provided at the output of the multiplexer 284.

The super/sub slice hardware unit 74 also produces a lateral address $E_{LI}$ 104. This lateral address value 104 has three bits and contains the current slice number being actively walked. Since $E_{LI}$ 104 is only 3 bits, the illustrated embodiment only allows up to 8 slices within a super slice. However, more bits could be added if necessary to provide more slices per super slice in a given application.

The super/sub slice unit 74 may also be used in a subslice mode. The subslice mode may be used to compensate for a slice angle that is too large for accurate reconstruction. In this case, the slice 21 is divided into subslices and the STE 32 walks across several subslices to create one full slice. In the subslice mode, an S offset subslice register 280 is provided to offset a scaled epsilon value.

Figure 8:
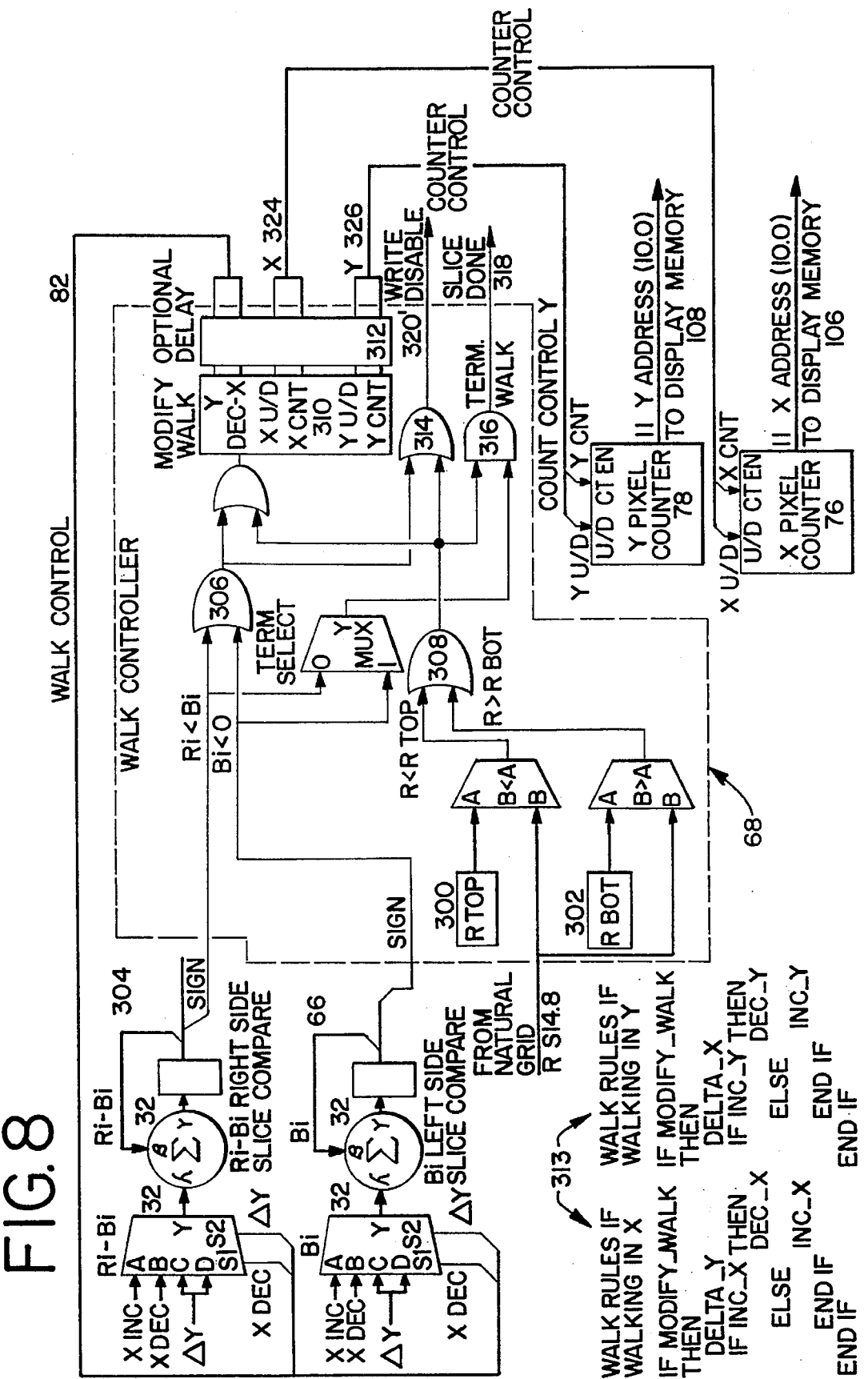
FIG. 8 is a block diagram of a preferred embodiment of the walk controller and display address generators of FIG. 3.

FIG. 8 illustrates a preferred embodiment of the walk controller 68 and the address generators 76 and 78. The walk controller 68 includes a range top register 300 and a range bottom register 302. These registers 300, 302 contain the starting and stopping range values for a superslice 504 being walked. The walk controller 68 also includes logic circuits such as OR gates 306, 308, 314, and an AND gate 316. The walk controller 68 receives the sign of the beta value from beta accumulator 66 and the sign of the ($R_I-B_I$) value from accumulator 304. The logic circuits 306, 308, and 314 detect the acoustic superslice boundaries 16, 18 and the top and bottom range boundaries for the superslice 504 being walked.

The walk controller 68 also includes a modify walk state machine 310 and an optional delay circuit 312. The modify walk state machine 310 is activated when the walking process exceeds one of the superslice boundaries 16, 18. After a boundary 16, 18 has been crossed, the modify walk state machine 310 and the delay circuit 312 cooperate to change the direction of the walk so that the walk continues along the superslice 504. The walk state machine 310 is preferably programmed with a walking rule set 313 to control the processing of the walking function.

For example, according to walking rule set 313, if the walk controller 68 were proceeding in an X direction toward the right and the logic circuits detected that the walk controller 68 had walked past the right-most boundary 16 of the superslice 504, the response of the modify walk state machine 310 would be to walk down one step in the Y direction and then reverse the direction in X and walk towards the left-most superslice boundary 18 in X. In this manner, the walk controller 68 continues to walk within the proper superslice 504 boundaries 16, 18.

The delay circuit 312 is controlled by the reconstruction control processor 62 and is used to allow overstepping in X or Y. Overstepping by the delay circuit 312 is preferably used when either the left or right slice angle exceeds 45 degrees from the vertical.

Also, when the walk controller 68 detects a condition whereby the walk has gone past a boundary, an output write disable 320 is generated so that no information is stored in the display data memory 38 outside the superslice 504. The walk controller 68 also produces a slice done signal 318 when the walk controller 68 determines that the walk process has been completed. In addition the walk controller 68 outputs a counter control signal for X 324 and for Y 326 to control address counters 78 and 76 respectively. The output from counters 78 and 76 are addresses which are fed to display memory 38.

Figure 9:
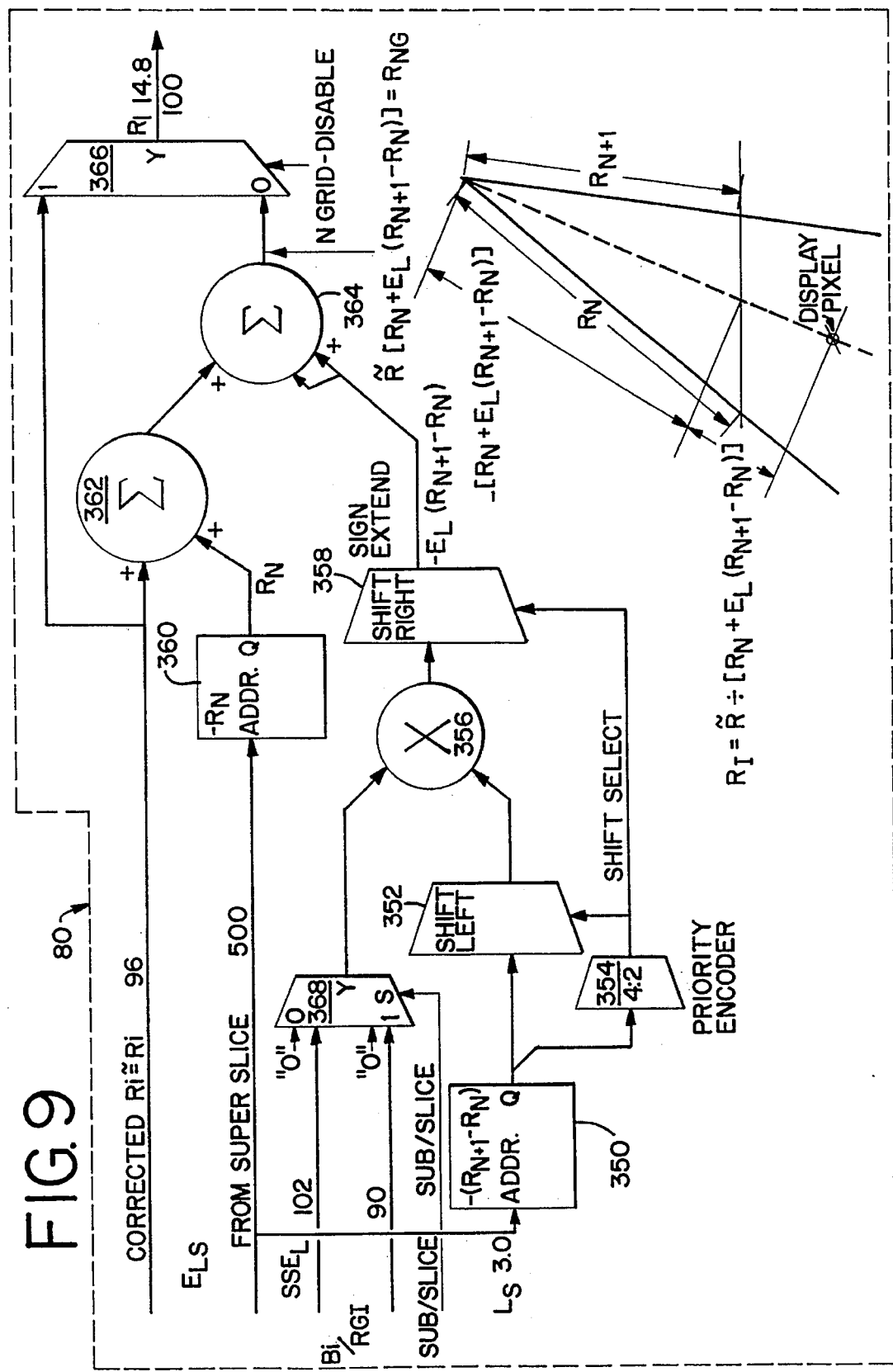
FIG. 9 is a block diagram of a preferred embodiment of the natural grid logic unit of FIG. 3.

FIG. 9 shows a preferred embodiment of the natural grid logic unit 80. The natural grid circuit 80 includes a first register file 350, a second register file 360, a first summer 362, a second summer 364, a multiplier 356, a selector 368, a right-shifter 358, a left-shifter 352, and an output selection unit 366. The selector 368 and the left-shifter 352 are connected to the multiplier 356. The left-shifter 352 is also connected to the first register file 350. A priority encoder 354 is connected to the first register file 350 and has an output that feeds left-shift register 352 and right-shift register 358. The right-shift register 358 is connected to multiplier 356 and summer 364. The summer 364 is connected to summer 362 at its input and is connected to selector 366 at its output. Summer 362 is connected to the second register file 360 and selector 366.

During operation of natural grid, either super slice epsilon value $SSE_L$ 102 or $\beta_I/RG_I$ value 90 appears at the output of selector 368 and is fed into multiplier 356. A second input to multiplier 356 comes from the first register file 350 which stores an offset value $-(R_{N+1}-R_N)$ (which may be used for vector array format), which was pre-loaded from the reconstruction processor 62.

In the preferred embodiment, the natural grid block 80 requires the distance from the imaging apex to the transducer face for each of the ultrasonic lines in the superslice in order to produce the desired natural grid offset value. This distance is computed by finding the distance from the image apex to the intersection of the ultrasonic line and the transducer face. The negation of these values is stored in the second register file 360. Values stored in the first register file 350 are computed by taking the difference between adjacent offset values.

Vector array format is used when the apex of the acoustic sector is offset from the face of the transducer. The output from the multiplier 356 is passed to an input of the second summer 364. The first summer 362 adds the output from the second register file 360, which contains $-(R_N)$, to the range corrected value 96 from error correction circuit 94. The output from the first summer 362 is fed into a second input of the second summer 364 which provides a natural grid offset corrected range value $R_{NG}$. An output selector 366 receives the value $R_{NG}$ and the corrected range value 96. When natural grid is enabled, the selector 366 provides natural grid range value $R_{NG}$ to the natural grid circuit output 100. Where the natural grid circuit is not enabled, the corrected range value 96 is passed through output selector 366 to the natural grid circuit output 100.

Additional advantages and modifications will readily occur to those skilled in the art. The invention, in its broader aspects, is therefore not limited to the specific details, representative apparatus, and illustrative examples shown and described. Various modifications and variation can be made to the present invention without varying from the scope or spirit of the invention. For example, alternative embodiments of the acoustic scan conversion device may be constructed without using one or more of the following components: error correction logic unit, superslice logic unit, and natural grid logic unit. In addition, various alternative configurations of the disclosed components may be made without departing from the scope of the present invention. Therefore, it is intended that the present invention cover all modifications and variations that come within the scope of the appended claims and their equivalents.

What is claimed is:

1. An ultrasound acoustic scan conversion device comprising:

an accumulator;

an error correction logic unit responsive to said accumulator, said error correction logic unit comprising an error correction circuit; and a walk controller responsive to said accumulator for generating a display memory address and for selecting increment values for said accumulator.

2. The device of claim 1, wherein an acoustic data memory address responsive to said accumulator comprises a range component and an arc length component.

3. The device of claim 2, wherein said error correction circuit receives said range component and produces an error corrected range component.

4. The device of claim 2, wherein said accumulator comprises a first accumulator and a second accumulator, and wherein said range component is responsive to said first accumulator and said arc length component is responsive to said second accumulator.

5. The device of claim 4, further comprising a division unit responsive to said first and second accumulators, said division unit dividing an output of the second accumulator by an output of the first accumulator.

6. The device of claim 5, further comprising a superslice logic unit responsive to said division unit, said superslice logic unit receiving said divided output and producing a polar angle address.

7. The device of claim 6, further comprising a natural grid logic unit responsive to said superslice logic unit and responsive to said error correction unit, said natural grid logic unit receiving said error corrected range component and said polar angle address and producing a natural grid range address.

8. A combination of the device of claim 1, an acoustic data memory, and a display memory.

9. An ultrasound acoustic scan conversion device comprising:

an accumulator;

a superslice logic unit responsive to said accumulator, said superslice logic unit producing a superslice polar angle address;

a display memory address generator; and a walk controller coupled to said accumulator and coupled to said display memory address generator unit, said walk controller selecting counter controls for said display memory address generator and selecting increment values for said accumulator, said walk controller cooperating with said superslice logic unit to walk along at least a portion of display points within a superslice, said superslice comprising a plurality of acoustic slices.

10. The device of claim 9, wherein said accumulator comprises a first accumulator and a second accumulator, and wherein said range component is responsive to said first accumulator and said arc length component is responsive to said second accumulator.

11. The device of claim 10, further comprising a division unit responsive to said first and second accumulators, said division unit dividing an output of the second accumulator by an output of the first accumulator.

12. The device of claim 11, wherein said superslice logic unit is responsive to said division unit.

13. The device of claim 12, further comprising a natural grid logic unit responsive to said accumulator.

14. The device of claim 13, wherein said natural grid logic unit adds a natural grid offset value to a received range component to generate a natural grid range value.

15. The device of claim 14, wherein said natural grid logic unit supports a vector array format.

16. The device of claim 9, wherein said superslice logic unit comprises a plurality of slice offset registers and a multiplexer responsive to said offset registers, said offset registers in communication with a reconstruction control processor.

17. The device of claim 16, wherein said superslice logic unit further comprises a register file containing scaling factors for a plurality of acoustic slices and a multiplier responsive to said register file and said multiplexer.

18. The device of claim 10, wherein said superslice logic unit operates in a subslice mode where each ultrasound slice comprises a plurality of subslices and said walk controller walks within at least one of said subslices.

19. A combination of the device of claim 9, an acoustic data memory, and a display memory.

20. An ultrasound acoustic scan conversion device comprising:

an accumulator;

a natural grid logic unit responsive to said accumulator, said natural grid logic unit producing a natural grid acoustic range value;

a walk controller responsive to said accumulator, said walk controller generating a display memory address and selecting increment values for said accumulator.

21. The device of claim 20, wherein said natural grid logic unit offsets an acoustic data address responsive to the accumulator to produce said natural grid acoustic range value.

22. The device of claim 20, wherein said natural grid logic unit supports a vector array format.

23. The device of claim 20, wherein said accumulator and said natural grid logic unit supports a linear format.

24. A combination of the device of claim 20, an acoustic data memory, and a display memory.

25. An ultrasound acoustic scan conversion device comprising:

an accumulator;

an acoustic coordinate error correction logic unit responsive to said accumulator, said acoustic coordinate error correction logic unit comprising an error correction circuit that produces an error corrected acoustic coordinate; and a walk controller responsive to said accumulator for generating a display memory address and for selecting increment values for said accumulator.

26. The device of claim 25, wherein said error correction circuit comprises an accumulator, a multiplier responsive to the accumulator, and an adder responsive to the multiplier, said adder producing said error corrected acoustic coordinate.

27. A method for performing scan conversion in an ultrasound system comprising the steps of:

loading at least one register within an accumulator;

producing an acoustic coordinate responsive to the accumulator;

performing error correction on the acoustic coordinate to generate an error corrected acoustic coordinate;

addressing an acoustic data memory with an acoustic data memory address responsive to the error corrected acoustic coordinate;

generating a display memory address corresponding to the acoustic data memory address; and addressing the display memory with the generated display memory address.

28. The method of claim 27, wherein the acoustic data memory address comprises a range component and an arc length component.

29. The method of claim 28, further comprising the step of dividing the arc length component by the range component to produce an epsilon value.

30. The method of claim 28, wherein said error corrected acoustic coordinate is responsive to the range component.

31. The method of claim 30, wherein said error corrected range component is produced by an error correction circuit receiving said epsilon value and said range component.

32. The method of claim 27, further comprising the step of transforming said epsilon value to a superslice epsilon value, said superslice epsilon value responsive to a plurality of acoustic slices.

33. The method of claim 32, wherein a natural grid range component is produced in response to said error corrected range component and said superslice epsilon value.

34. The method of claim 27, further comprising the step of transforming said epsilon value to a subslice epsilon value, said subslice epsilon value corresponding to a subslice within an acoustic slice.

35. The method of claim 27, further comprising the step of periodically updating start and increment values for said accumulator and periodically updating start values for a display memory address generator.

36. A method of performing scan conversion in an ultrasound system comprising the steps of:

loading at least one register within an accumulator;

producing an acoustic coordinate responsive to the accumulator;

producing a natural grid acoustic range value;

offsetting said acoustic coordinate to produce the natural grid acoustic range value;

addressing the acoustic data memory with an acoustic data memory address responsive to the natural grid range value;

generating a display memory address corresponding to the acoustic data memory address; and addressing the display memory with the generated display memory address.

* * * * *